United States Patent
Myers et al.

(10) Patent No.: US 7,187,124 B2
(45) Date of Patent: Mar. 6, 2007

(54) TRANSPARENT ELECTRON SOURCE EMITTER DEVICE AND METHOD

(75) Inventors: Timothy F. Myers, Philomath, OR (US); John Chen, Corvallis, OR (US); Chien-Hua Chen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 10/781,212

(22) Filed: Feb. 17, 2004

(65) Prior Publication Data

US 2005/0179026 A1    Aug. 18, 2005

(51) Int. Cl.
*H01J 1/62* (2006.01)
*H01J 63/04* (2006.01)

(52) U.S. Cl. .................................. 313/507; 313/495

(58) Field of Classification Search ........ 313/308–310, 313/336, 346, 498–499, 495, 507; 257/9–11, 257/25, 37; 445/50
See application file for complete search history.

(56) References Cited

U.S. PATENT DOCUMENTS

| | | | | |
|---|---|---|---|---|
| 5,646,479 | A | * | 7/1997 | Troxell ....................... 313/495 |
| 6,166,487 | A | * | 12/2000 | Negishi et al. ............. 313/495 |
| 6,770,353 | B1 | * | 8/2004 | Mardilovich et al. ....... 428/209 |
| 2002/0167001 | A1 | * | 11/2002 | Chen et al. ................... 257/10 |
| 2003/0160557 | A1 | * | 8/2003 | Chen et al. ................... 313/310 |

* cited by examiner

*Primary Examiner*—Edward J. Glick
*Assistant Examiner*—Anastasia S. Midkiff

(57) ABSTRACT

A photonic assisted emitter including an at least partially transparent electron source layer, a thin metal layer; and a tunneling layer disposed between said at least partially transparent electron source layer and said thin metal layer.

39 Claims, 8 Drawing Sheets

TRANSPARENT ELECTRON SOURCE EMITTER DEVICE AND METHOD

FIELD OF THE INVENTION

The invention is in the microelectronics field. The invention particularly concerns emitters and devices incorporating emitters.

BACKGROUND OF THE INVENTION

Emitters have a wide range of potential applicability in the microelectronics field. An emitter emits electrons in response to an electrical signal. The controlled emissions form a basis to create a range of useful electrical and optical effects. Emitters include spindt tip cold cathode devices as well as flat emitters.

Challenges presented by spindt tip emitters include their manufacturability and stability over their service life. Manufacturing of spindt tip emitters requires a number of relatively difficult deposition steps, with the result that it is generally expensive and time consuming. Once formed, a tip may be unstable as it can change as it is operated, and is subject to damage if not operated in high vacuum.

Flat emitters are advantageous compared to spindt tip emitters because they present a larger emission surface and can be operated in less stringent vacuum environments. Flat emitters include a dielectric emission layer that responds to an electrical field created by a potential applied between an electron source and a thin metal layer on either side of a dielectric layer. Electrons tunnel from the valence band to the conduction band of the dielectric. Once into the conduction band, the electrons are accelerated towards the thin metal layer. The electrons then travel through the thin metal and exit the emitter. While flat emitters have advantages relative to spindt tip emitters, they are less efficient. It would be advantageous to improve the efficiency of flat emitters.

SUMMARY OF THE INVENTION

According to an embodiment of the invention, a photonic assisted emitter includes an at least partially transparent electron source layer, a thin metal layer, and a tunneling layer disposed between said at least partially transparent electron source layer and said thin metal layer.

DETAILED DESCRIPTION

The present invention is directed to emitters, emitter devices, methods for emitting electrons, and methods for making emitters. An exemplary method of the invention includes a two-step emission process wherein a voltage is applied across a tunneling layer disposed between a conductive transparent electron source layer and a thin metal layer, and a surface of the tunneling layer is illuminated with photons through the conductive transparent electron source layer to enhance electron tunneling in the emitter. The term "transparent" encompasses materials that are capable of allowing photons to pass through, e.g., photon transmissible materials. It also encompasses fully and partially transparent materials that allow for some permeability to electromagnetic radiation of specified frequencies, typically in the infrared, visible, and ultraviolet ranges. Further, it encompasses opaque materials that have openings sufficient to allow for transmission of electromagnetic radiation in the form of photons. The electron emission of the emitter is controlled and modulated by both the voltage applied across the tunneling layer and the amount of photons absorbed within the tunneling layer. Although the invention is not bound to any particular theory, it is believed that the emitters described herein that use photon assisted tunneling operate by using the absorbed photon energy (hv) to effectively lower the amount of energy required to overcome the tunneling barrier.

An exemplary emitter of the invention includes a transparent source layer, a thin metal layer, and a tunneling layer disposed between the transparent source layer and a thin metal layer. Applying a voltage across the tunneling layer and illuminating the tunneling layer with photons passing through the transparent source layer enhances electron emission in the emitter by effectively lowering the amount of energy required to transit the tunneling barrier through photon absorption. Other exemplary invention embodiments may be directed to emitters, methods for making emitters, and devices incorporating an emitter, with examples including an integrated circuit, a display device, and a memory device.

Figure 1:
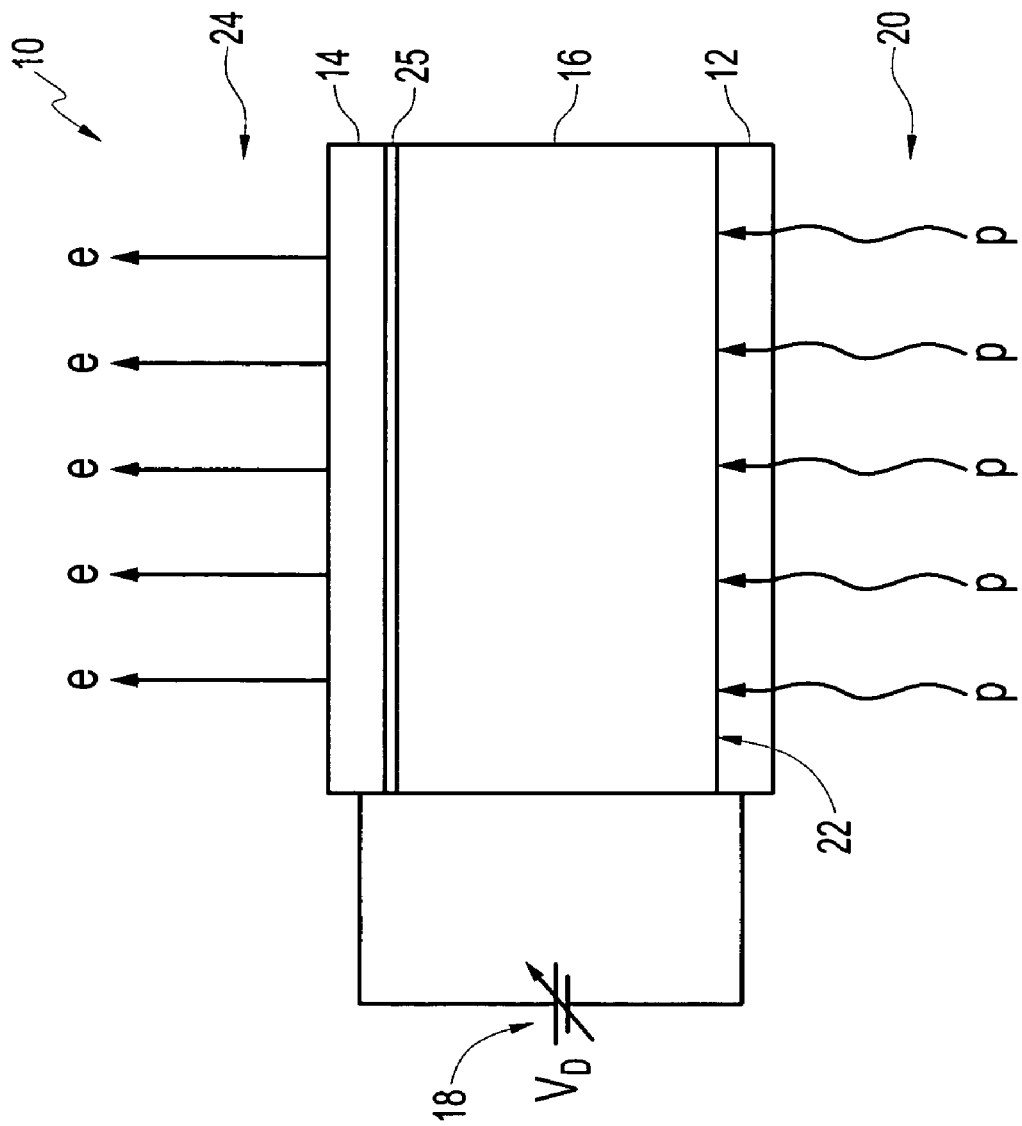
FIG. 1 is a schematic cross section of an exemplary embodiment of the invention and a voltage source.

Turning now to the drawings, FIG. 1 is a schematic cross section of an exemplary embodiment emitter 10. The emitter 10 includes a conductive transparent electron source layer 12, a thin metal layer 14, and a tunneling layer 16 disposed between the thin metal layer 14 and the conductive transparent electron source layer 12. The variable emitter voltage source 18 is operatively coupled to the emitter 10 through the conductive transparent electron source layer 12 and the thin metal layer 14, to permit application of a voltage across the tunneling layer 16. Photons 20 may be used to illuminate a surface 22 of the tunneling layer 16 through the conductive transparent electron source layer 12 and be absorbed, where the surface 22 is a surface of the tunneling layer 16 that is closest to the conductive transparent electron source layer 12. The photons 20 may be generally but not exclusively at visible light wavelengths, such as infrared or ultraviolet depending on the material of the tunneling layer chosen. In an embodiment of the invention in which the tunneling layer 16 is disposed on the conductive transparent electron source layer 12, the surface 22 is a surface of the tunneling layer 16 that is in contact with the conductive transparent electron source layer 12. With the application of a voltage across the tunneling layer 16 and, the illumination of the surface 22, electron emission from the emitter 10 is enhanced.

When the photons 20 with energy hv are absorbed by the tunneling layer, the threshold tunneling voltage of the tunneling layer 16 is effectively lowered for a given electron emission density. Lowering the threshold tunneling voltage of the tunneling layer 16 permits a higher rate of emission of electrons 24 by enhancing tunneling for a given voltage from the variable emitter voltage source 18. The amount of increased emission is also determined by the quantity of photons reaching and absorbed by the tunneling layer. The source for the photons 20 may be separate from the emitter, e.g., a conventional backlight for a display device, or it may be integrated with the emitter 10.

In an embodiment of the invention, the conductive transparent electron source layer 12 is an optically transparent metal oxide. In an embodiment of the invention, this metal oxide is InSnO. In an embodiment of the invention, the conductive transparent electron source layer 12 has a thickness of between about 0.05 microns and about 0.3 microns. In another embodiment of the invention, the conductive transparent electron source layer 12 has a thickness of about 0.15 microns. In another embodiment the conductive transparent electron source layer 12 is a porous opaque conductive material of various thickness. Those of skill in the art will appreciate that several different conductive and transparent materials exist and can be substituted. The important properties are that the material be conductive to allow for being an electron source, and that the material be fully or partially transparent to allow for the transmission of photons through or within the material to the tunneling layer.

In an embodiment of the invention, the tunneling layer 16 includes nodular silicon. In an embodiment of the invention, the tunneling layer has a thickness of between about 200 Å and about 1,000 Å. In another embodiment of the invention, the tunneling layer has a thickness of about 1,000 Å. Other tunneling layer materials exist and can be used, including, for example, $TaO_2$, SiC, $Si_xN_y$. Also, in addition to electron tunneling, the tunneling layer can be used to create photons. For instance, $TaO_2$ and $Si_xN_y$ are also effective in creating photons as a by product of the electron tunneling thereby allowing for an active conversion of photons of one or more frequencies into photons of a different band of frequencies.

In an embodiment of the invention, an oxide layer 25 is thermally grown, deposited or otherwise disposed on the tunneling layer 16 between the tunneling layer 16 and the thin metal layer 14. In an embodiment of the invention, the oxide layer has a thickness of between about 50 Å and about 200 Å. In another embodiment of the invention, the oxide layer 25 has a thickness of about 50 Å.

Figure 2:
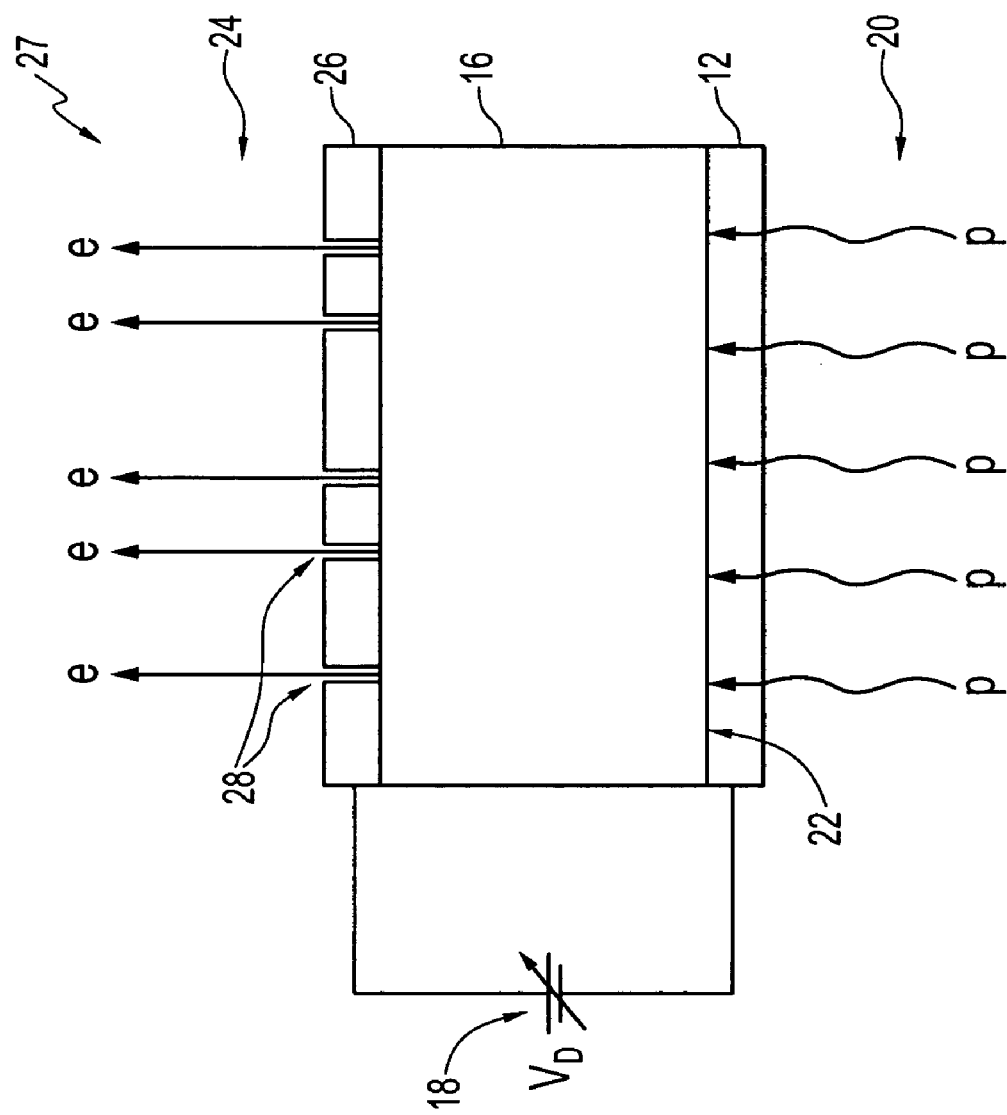
FIG. 2 is a schematic cross section of an exemplary embodiment of the invention and a voltage source.

FIG. 2 illustrates an emitter 27 according to an embodiment of the invention, with the variable emitter voltage source 18 operably coupled to the emitter 27. In this embodiment, the emission of the electrons 24 is further enhanced by use of a porous thin metal layer 26 with nanohole openings 28. The nanohole openings 28 allow the electrons 24 to escape with less energy than is required to escape through a thin metal layer without openings.

In an embodiment of the invention, the porous thin metal layer 26 is made of a conductive material. In an embodiment of the invention, this conductive material is platinum. In an embodiment of the invention, the thin metal layer has a thickness of between about 20 Å and about 120 Å. In another embodiment of the invention, the thin metal layer has a thickness of about 100 Å.

The nanohole openings 28 may have different shapes and still be effective. The nanohole openings 28 may be circular, crack-like (having small width and longer length), fissures, voids, serpentine structures, or openings between interconnected islands of thin metal materials. The nanohole openings 28 are typically sized in terms of width (the smallest dimension), length (the largest dimension) or diameter (if roughly circular, the average opening dimension). Typically, the nanohole openings 28 have absolute dimensions of less than about 200 nanometers such as between about 1 and about 100 nanometers, and typically between about 1 to about 10 nanometers for the narrowest (width) dimension and about 10 nanometers to about 100 nanometers for a length such as with cracks or fissures. Typically, the porosity of the thin film material should be at least 12.5%.

The distribution of the nanohole openings 28 is typically uniform across the surface of the emitting surface (at least on average) and spaced sufficiently so that the thin metal layer maintains a contiguous electrical connection over the surface of the emitter.

The nanohole openings 28 can be either of a uniform size or randomly distributed in size. The spacing of the nanohole openings 28 may be either uniformly or randomly spaced but on average should be distributed uniformly (at least on average) across the surface of the emission surface to prevent localized concentration of emissions that may damage the emitter. Depending on the tunneling material used, the nanohole openings 28 allow for the emission of photons from the tunneling layer by providing openings for exit.

Figure 3:
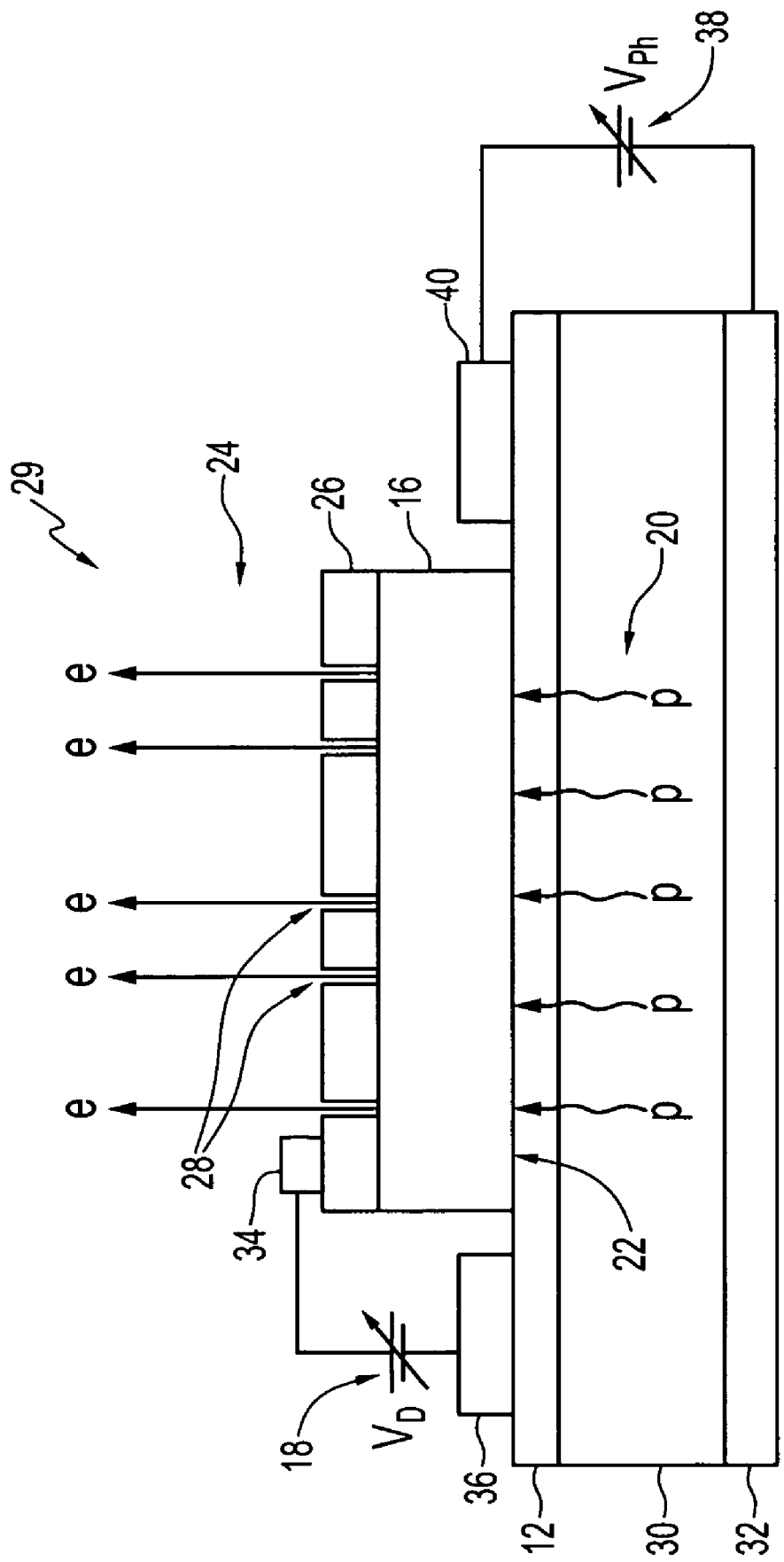
FIG. 3 is a schematic cross section of an exemplary embodiment of the invention and voltage sources.

FIG. 3 illustrates an emitter 29 in accordance with an embodiment of the invention, with voltage sources operably coupled to the emitter 29. In this embodiment, the conductive transparent electron source layer 12 is disposed on a light-emitting layer 30, which is disposed on a substrate contact layer 32. The variable emitter voltage source 18 is operably coupled to a thin metal layer contact 34 and a conducting layer contact 36. A variable light emitter voltage source 38 is operably coupled to a conducting layer contact 40 and the substrate contact layer 32. The light-emitting layer 30 generates the photons 20 when the variable light emitter voltage source 38 applies a voltage across the light-emitting layer 30. The photons 20 impinge on the surface 22 of the tunneling layer 16 and are absorbed within.

In an embodiment of the invention, the light-emitting layer 30 includes silicon rich $Si_xN_y$. In another embodiment of the invention, the light emitting layer 30 is $TaO_2$. In an embodiment of the invention, the light-emitting layer 30 has a thickness between about 100 microns and about 1000 microns. In another embodiment of the invention, the light-emitting layer 30 has a thickness of about 500 microns. Optionally, the light-emitting layer 30 can be other light sources such as OLED (organic light emitting device), fluorescent, or LED, just to name a few.

Figure 4:
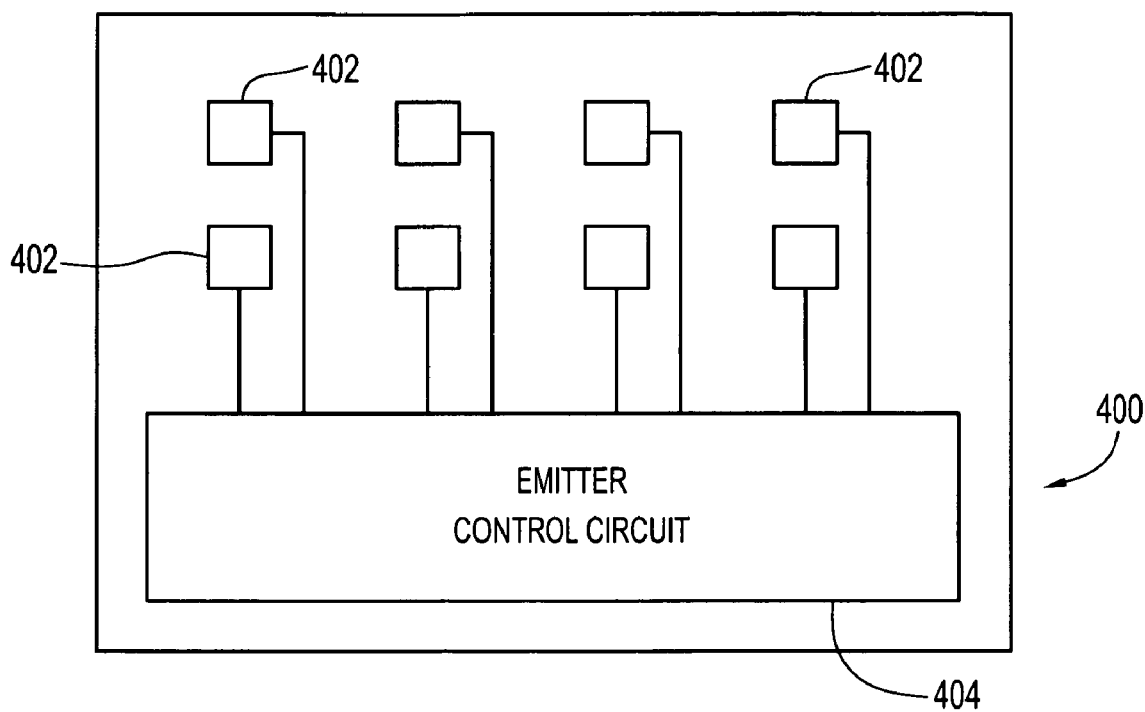
FIG. 4 is a schematic cross section of an exemplary embodiment integrated emitter circuit of the invention.

FIG. 4 is a schematic of an exemplary integrated circuit embodiment 400 of the invention that includes at least one and typically a plurality of integrated emitters 402 (such as any one or combination of emitters the emitters of FIGS. 1–3) arranged in an array or other geometrical manner. An emitter control circuit 404 is integrated onto the integrated circuit 400 and used to operate the integrated emitters 402.

Figure 5:
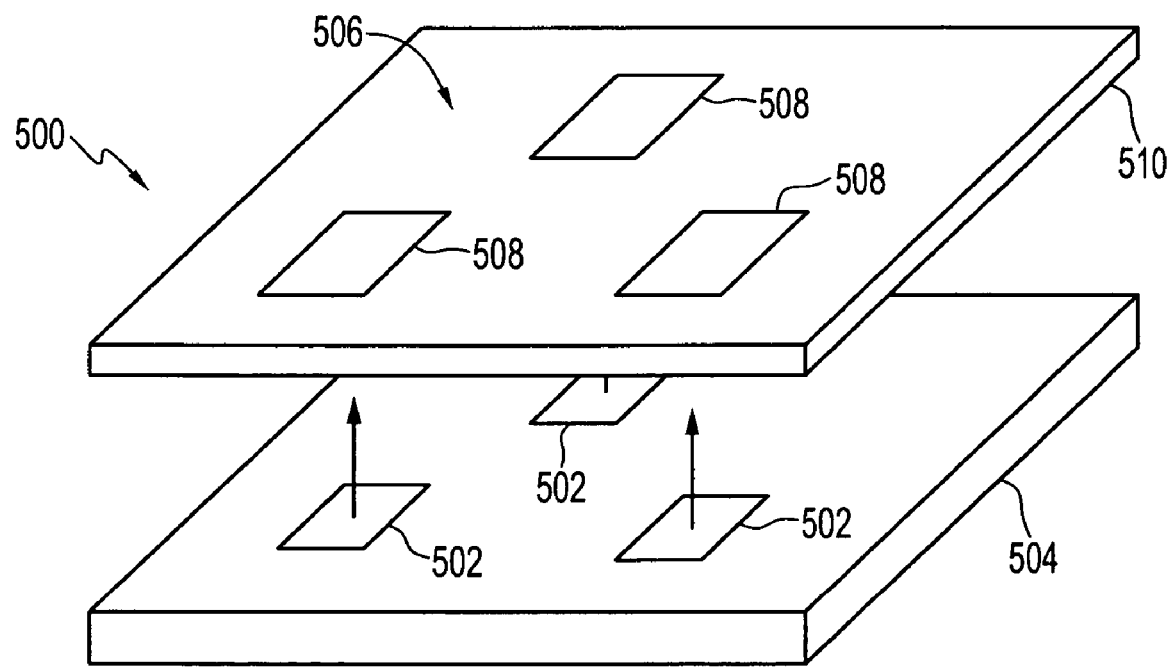
FIG. 5 is a schematic cross section of an exemplary embodiment emitter display device of the invention.

FIG. 5 is a schematic embodiment of a display application using an integrated emitter 500 of the invention. In particular, this embodiment entails a plurality of emitters 502 formed in an integrated circuit 504. Each of the emitters 502 emits electrons, as generally illustrated by the upwardly directed arrows of FIG. 5. An anode structure 506 having a plurality of individual pixels 508 that form a display 510 receives the emitted electrons. The pixels 508 are typically a phosphor material that creates photons when struck by emissions from the emitters 502. Other components such as a power supply, a control circuit, and the like may also be provided.

Figure 6:
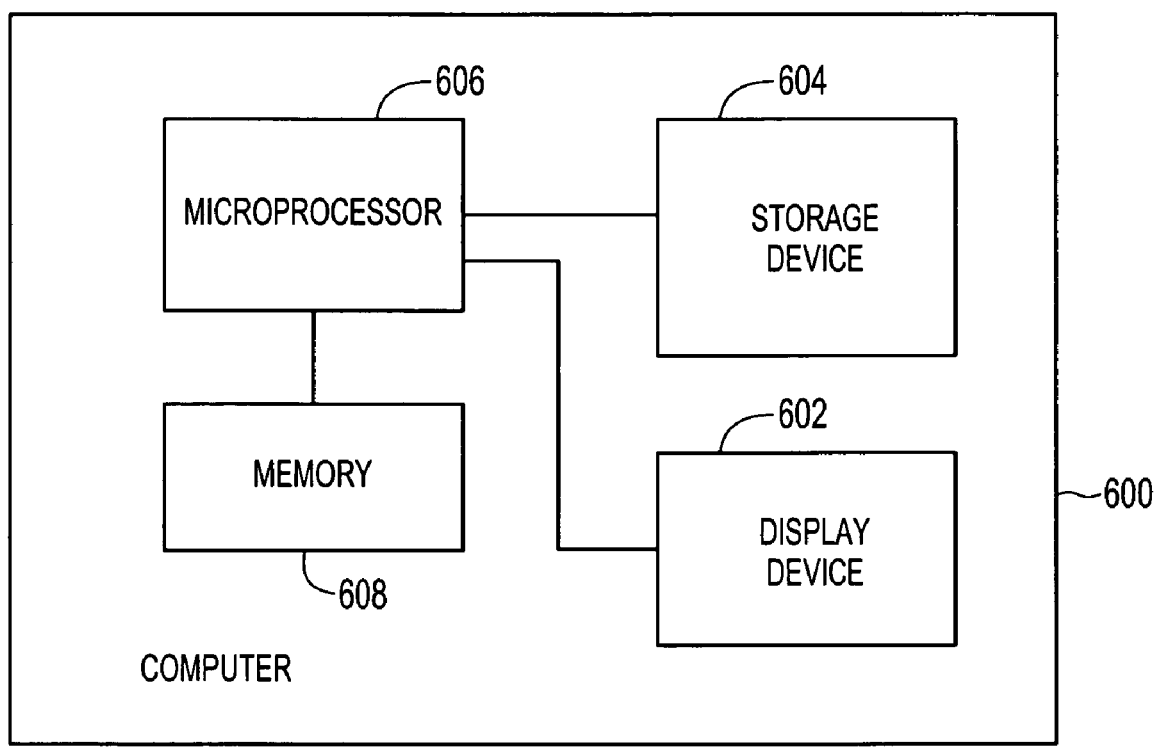
FIG. 6 is a schematic cross section of a computer including exemplary embodiment emitters of the invention.

FIG. 6 is an exemplary block diagram of a computer 600 that includes a microprocessor 606, a memory 608 that is coupled to the microprocessor 606, and electronic devices, a storage device 604 and a display device 602. The electronic devices are coupled to the microprocessor 606. The microprocessor 606 is capable of executing instructions from the memory 608 to allow for the transfer of data between the memory 608 and the electronic devices, such as the storage device 604 and the display device 602. At least one of the storage device 604 and the display device 602 includes an integrated circuit such as the integrated circuit 400 that has emitters 402 incorporating the invention.

Figure 7A:
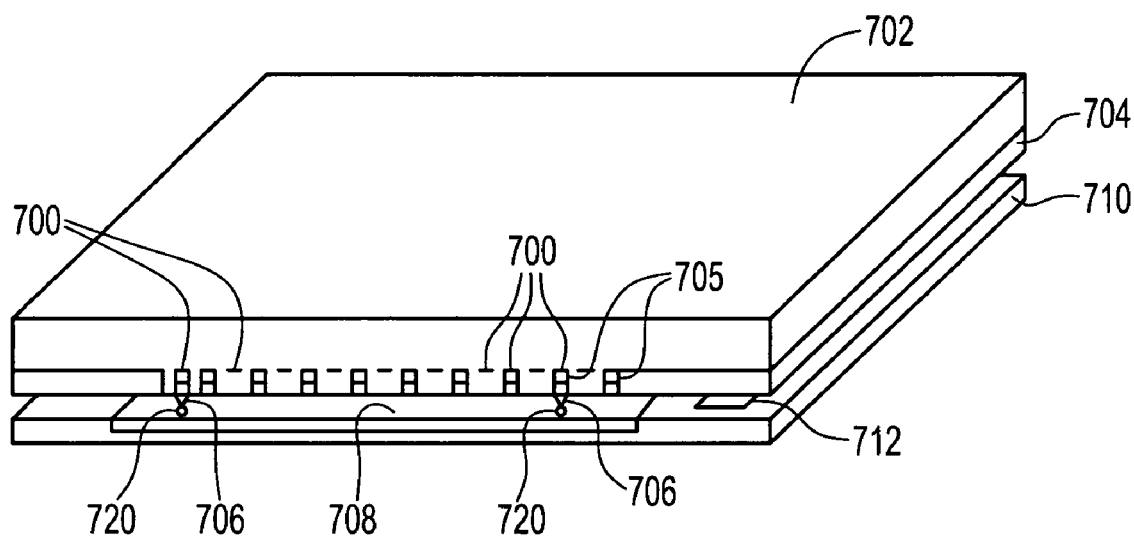
FIG. 7 is a schematic cross section of a memory device including exemplary embodiment emitter of the invention.
Figure 7B:
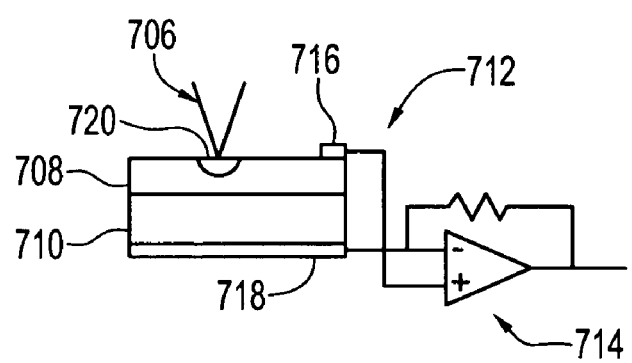

A particular memory or storage device is schematically shown in FIGS. 7A and 7B. The memory device includes a plurality of flat emitters 700 of the invention that include at least a transparent electron source layer, a tunneling layer, and a thin metal layer. In this exemplary embodiment, the plurality of the flat emitters 700 are integrated into an integrated circuit 702. A lens array 704 of focusing mechanisms 705 that may be aligned with the plurality of flat emitters 700 is used to create a focused beam 706 of electrons that affects a recording surface media 708. The focusing mechanisms 705 may be an electrostatic focusing lens having an aperture in a conductor set at a predetermined voltage. The conductor voltage is typically but optionally adjustable to change the focusing effect of the focusing lens. The recording surface media 708 is linked to a mover 710 that positions the recording surface media 708 with respect to the plurality of flat emitters 700 and/or the lens array 704. Typically, the mover 710 has a reader circuit 712 integrated within.

The reader circuit 712 is illustrated in FIG. 7B as an amplifier 714 making a first ohmic contact 716 to the recording surface media 708 and a second ohmic contact 718 to the mover 710, typically a semiconductor or conductor substrate. When a focused beam 706 strikes the recording surface media 708, if the current density of the focused beam is high enough, the media is phase-changed to create an affected media area 720. When a low current density focused beam 706 is applied to the recording surface media 708 surface, different rates of current flow are detected by the amplifier 714, the output of which may be used as reader output. Thus, by affecting the recording surface media 708 with the energy from the one of the plurality of flat emitters 700, information is stored in the media using structural phase changed properties of the media and can be read from the media. An exemplary phase-change material is InSe.

Figure 8:
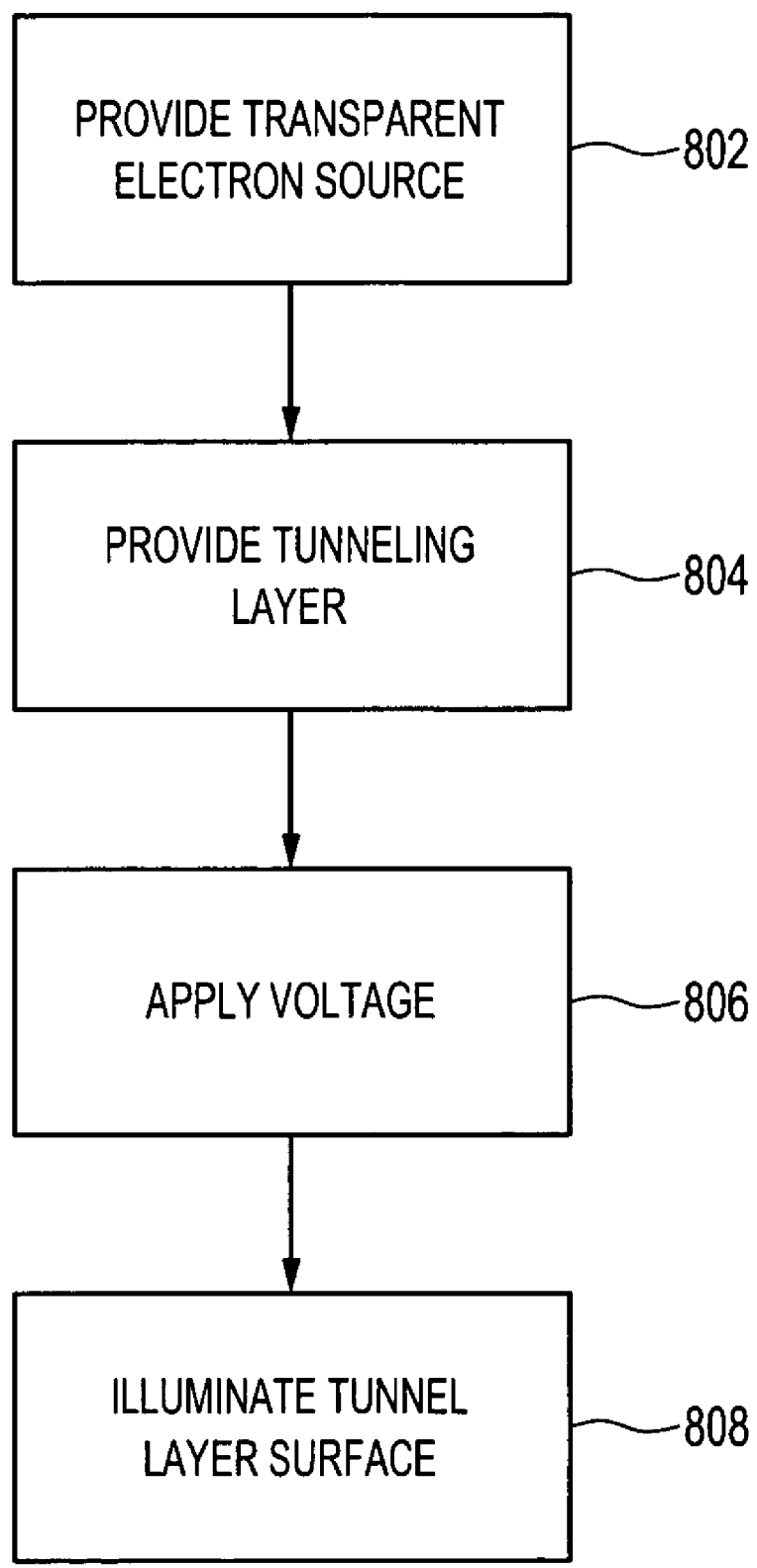
FIG. 8 is a flow chart of an exemplary embodiment of a method the invention.

FIG. 8 illustrates a method for enhancing electron tunneling in accordance with an embodiment of the invention. The method is applicable to any emitter in accordance with the invention, but, for purposes of illustration, will be discussed with reference to the emitter 10 of FIG. 1. The conductive transparent electron source layer 12 is provided in the emitter 10 (step 802). The tunneling layer 16 is also provided in the emitter 10 (step 804). A voltage is applied to the emitter 10 to stimulate emissions (Step 806). While the voltage is applied, the surface 22 of the tunneling layer 16 is illuminated with the photons 20 through the conductive transparent electron source layer 12 to enhance electron tunneling in the emitter 10 (or 27 or 29) (step 808). In step 806, the level of enhancement will depend upon the voltage applied across the tunneling layer and the amount of photons absorbed within the tunneling layer. Embodiments of the invention include use of an external source of photons, for example, as well as embodiments where a photon source that is integrated with the emitter.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, it will be appreciated that many applications in addition to a memory and a visual display may be practiced using an emitter of the invention.

Various features of the invention are set forth in the appended claims.

What is claimed is:

1. A photonic assisted emitter, comprising:
    an at least partially transparent electron source layer of optically transparent metal oxide;
    a thin metal layer; and
    a tunneling layer disposed between said at least partially transparent electron source layer and said thin metal layer.

2. An emitter as defined in claim 1 wherein said optically transparent metal oxide comprises InSnO.

3. An emitter as defined by claim 1 wherein said tunneling layer is disposed on said at least partially transparent electron source layer.

4. A photonic assisted emitter, comprising:
    an at least partially transparent electron source;
    a thin metal layer; and
    a tunneling layer disposed between said at least partially transparent electron source layer and said thin metal layer, wherein said tunneling layer comprises nodular silicon.

5. An emitter as defined by claim 1 wherein said tunneling layer has a thickness of between about 200 Å and about 1,000 Å.

6. An emitter as defined by claim 1 wherein said tunneling layer has a thickness of about 1,000 Å.

7. An emitter as defined by claim 1 further comprising an oxide layer disposed on said tunneling layer.

8. An emitter as defined by claim 7 wherein said oxide layer has a thickness of between about 50 Å and about 200 Å.

9. An emitter as defined by claim 7 wherein said oxide layer has a thickness of about 50 Å.

10. A photonic assisted emitter, comprising:
    an at least partially transparent electron source;
    a thin metal layer; and
    a tunneling layer disposed between said at least partially transparent electron source layer and said thin metal layer, wherein said thin metal layer comprises a porous thin metal layer having nanohole openings.

11. An emitter as defined by claim 10 wherein a diameter of said nanohole openings are between about 1 nanometer and about 100 nanometers.

12. An emitter as defined by claim 10 wherein said nanohole openings are uniformly distributed on average but randomly spread across the surface of said porous thin metal layer.

13. An emitter as defined by claim 10 wherein said porous thin metal layer has a porosity of at least 12.5%.

14. An emitter as defined by claim 1 wherein said thin metal layer comprises platinum.

15. An emitter as defined in claim 1 wherein said thin metal layer has a thickness of between about 20 Å and about 120 Å.

16. An emitter as defined in claim 1 wherein said thin metal layer has a thickness of about 100 Å.

17. A photonic assisted emitter. comprising:
an at least partially transparent electron source;
a thin metal layer; and
a tunneling layer disposed between said at least partially transparent electron source layer and said thin metal layer, further comprising a light emitting layer, wherein said at least partially transparent electron source layer is disposed on said light emitting layer.

18. An emitter as defined in claim 17, wherein said light emitting layer comprises $Si_xN_y$.

19. An emitter as defined in claim 17, wherein said light emitting layer has a thickness between about 100 microns and about 1000 microns.

20. An emitter as defined in claim 17, wherein said light emitting layer has a thickness of about 500 microns.

21. An emitter as defined in claim 17, further comprising a substrate contact layer, wherein said light emitting layer is disposed on said substrate contact layer.

22. An emitter as defined in claim 17, wherein said light emitting layer comprises an organic light emitting device.

23. An integrated circuit, comprising:
a plurality of emitters as defined by claim 1; and
control circuitry connected to said plurality of emitters.

24. A device making use of emissions, the device comprising:
an emitter as defined by claim 1; and
a target, said emitter and said target being arranged to direct said emissions from said emitter toward said target to cause an effect on said target.

25. A device as defined by claim 24 wherein said target comprises one of a memory medium or a display medium.

26. A device as defined by claim 25, further comprising focusing means positioned between said target and said thin metal layer.

27. A device as defined by claim 26 wherein said focusing means comprises an electrostatic focusing lens having an aperture in a conductor settable at a conductor voltage, said conductor voltage being adjustable to change the focusing effect of said focusing lens.

28. A device as defined by claim 24 wherein said target comprises a memory medium, and wherein said effect comprises a phase change, said phase change being detectable through measurement of electrical properties of said memory medium.

29. A device as defined by claim 28, further comprising a mover connected to one of said electron source or said memory medium.

30. A device as defined by claim 24 wherein said target comprises a display medium having a plurality of pixels, and wherein said effect comprises a visual change in one of said pixels.

31. An emitter device comprising:
a plurality of emitters as defined by claim 1 arranged in an array of emitters;
a memory medium;
a plurality of focusing lenses arranged to cooperate with said array of emitters, each of said focusing lenses being configured to focus electrons emitted from one of said plurality of emitters and direct said focused electrons towards said memory medium, said focused electrons causing a structural phase change in said memory medium upon impact; and a reader circuit for detecting the structural phase change in said memory medium through measurement of electrical properties of said memory medium.

32. An emitter as defined by claim 1, wherein said tunneling layer is a layer formed from a material selected from the group of materials consisting of $TaO_2$, SiC, $Si_xN_y$.

33. An emitter as defined by claim 1, wherein said tunneling comprises a material that creates photons as a by product of electron tunneling.

34. An emitter as defined by claim 33, wherein said tunneling layer is a layer formed from a material selected from the group of materials consisting of $TaO_2$ and $Si_xN_y$.

35. A method for making an emitter comprising the steps of:
forming an at least partially transparent electron source layer of an optically transparent metal oxide;
forming a tunneling layer on said at least partially transparent electron source layer; and
forming a thin metal layer on said tunneling layer.

36. A method for enhancing electron tunneling in an emitter, the method comprising the steps of:
providing an at least partially transparent electron source layer of an optically transparent metal oxide in the emitter;
providing a tunneling layer in the emitter; and
illuminating with photons a surface of said tunneling layer through said at least partially transparent electron source layer to enhance electron tunneling in the emitter.

37. An apparatus for electron emission, the apparatus comprising:
means for providing an at least partially transparent electron source layer of an optically transparent metal oxide in the emitter;
means for providing a tunneling layer in the emitter; and
means for illuminating with photons a surface of said tunneling layer through said at least partially transparent electron source layer to enhance electron tunneling in the emitter.

38. A method for enhancing electron tunneling in an emitter, the method comprising the steps of:
applying a voltage across a tunneling layer disposed between a conductive at least partially transparent electron source layer of an optically transparent metal oxide and a thin metal layer; and
illuminating a surface of said tunneling layer with photons through said conductive at least partially transparent electron source layer.

39. A photonic assisted emitter, comprising:
an at least partially transparent electron source layer of an optically transparent metal oxide;
a thin metal layer; and
a tunneling layer disposed between said at least partially transparent electron source layer and said thin metal layer, said tunneling layer including means for actively converting photons of one or more frequencies into photons of a different band of frequencies.

* * * * *